Nov. 12, 1968    J. S. CHANDLER    3,410,639
PULL-DOWN DEVICE FOR MOTION PICTURE CAMERAS
Filed March 28, 1966    3 Sheets-Sheet 1

INVENTOR.
JASPER S. CHANDLER
BY
Robert W. Hampton

ATTORNEYS

Nov. 12, 1968 J. S. CHANDLER 3,410,639
PULL-DOWN DEVICE FOR MOTION PICTURE CAMERAS
Filed March 28, 1966 3 Sheets-Sheet 2

INVENTOR.
JASPER S. CHANDLER
BY Robert W. Hampton
Karl W. Flaramy
ATTORNEYS

Nov. 12, 1968  J. S. CHANDLER  3,410,639
PULL-DOWN DEVICE FOR MOTION PICTURE CAMERAS
Filed March 28, 1966  3 Sheets-Sheet 3

INVENTOR.
JASPER S. CHANDLER
BY Robert W. Hampton

ATTORNEYS

United States Patent Office 3,410,639
Patented Nov. 12, 1968

3,410,639
PULL-DOWN DEVICE FOR MOTION
PICTURE CAMERAS
Jasper S. Chandler, Rochester, N.Y., assignor to Eastman
Kodak Company, Rochester, N.Y., a corporation of
New Jersey
Filed Mar. 28, 1966, Ser. No. 537,849
4 Claims. (Cl. 352—194)

This invention is directed particularly to an intermittent pull-down mechanism for motion picture apparatus, and particularly to such a pull-down mechanism which is so compact that it permits a motion picture camera using it to be designed whose width is substantially the same as the width of a film cartridge to be used therein.

In the past, various forms of film pull-down devices have been disclosed. These usually provide cam mechanisms for intermittently advancing a perforated film strip along a selected path relative to a film gate for exposure. Generally speaking, such cam operated devices include a suitable rotatable peripheral cam whose axis of rotation extends substantially laterally of and parallel to the path along which the film is to be moved. The cam has follower surfaces disposed relative to each other in angular relationship for engaging the cam as it is turned. A claw is normally associated with the follower for engaging the film strip once during each cam revolution. The mounting means for the cam follower permits free claw movement longitudinally and perpendicularly to the selected film path. A drive mechanism is provided for rotating the cam at an appropriate speed to oscillate the claw at a frequency of claw movement per unit time period corresponding to some desired exposure rate. Means are also provided for normally urging the follower surfaces in a direction to hold contact with the cam surface. Devices of the foregoing type have proved reasonably satisfactory and useful. They have the disadvantage of requiring substantial space for installation. The power required for driving the device is frequently more than is normally desired.

The present invention attempts to improve on the prior art structures through the use of a new type of pull-down mechanism which retains a claw-type intermittent film advancing device for moving the film within the cameras. As the invention will be described, it will be found to comprise essentially a composite rotatable cam-shuttle means including an advance cam and an in-and-out cam. These function with a shutter and a drive gear means for the assembly. With these, a pair of cam follower surfaces is positioned for maintaining continual contact with the advance cam. There is also a cam follower surface for the in-and-out cam by which the positioning of a pull-down claw is established relative to the surface of the film strip. A reciprocating elongated shuttle structure which is generally semi-tubular in cross-sectional shape is arranged to be reciprocated under the control of the advance cam and to be arcuately displaced against a resilient force to bring a film drive claw into and out of engagement with the film during selected and controlled periods of its reciprocation. A substantially friction-free structure provides rolling contact between the reciprocating shuttle and its support frame so that the shuttle motion controlled by the rotation of the cam elements is maintained as a smooth operation with minimal power requirements.

With these thoughts in mind, the invention seeks to provide an intermittent film transport mechanism of the claw-type which is particularly narrow and compact in its design to provide a slender design for the camera substantially commensurate with the width of the film cartridge itself, thereby to reduce the bulky and spaceconsuming units of the prior art.

It is also contemplated that the invention shall be of such nature that the characteristics of acceleration and deceleration of the movable shuttle for advancing the film strip essentially eliminates harmonics above the third, both during film advance and the in-and-out claw motions. This tends to reduce very substantially drive noise, particularly that resulting from resonant exciting frequencies in other parts of the mechanism which usually first manifests itself as the drive rate increases above approximately sixty-four film frames per second.

It is a further object of the invention to provide a construction for reducing the acceleration of the unit at the end of the advance stroke, thereby to decrease markedly any tendency of the film to overshoot the gate and thereby produce unsteady pictures at it advances, and to provide a device which is capable of extremely high operational speed necessary for slow-motion pictures.

A further object of the invention is that of providing for greatly reduced friction on moving parts by avoiding slide action on rods or flat surfaces where the effects of friction particularly manifest themselves and become more evident with continued use of the device. The substantial friction reduction makes it possible to improve considerably the life of the drive battery used to control the drive of moving parts. It also insures less wear on the pull-down mechanism which otherwise would result from undesirably high friction.

The invention has been illustrated by the accompanying drawings in one of its preferred forms. In these drawings:

FIG. 1 represents a plan view particularly to show the advance and in-and-out movements of the drive shuttle. The view may be considered as one taken substantially on the line 1—1 of FIG. 3 to show the device with the outer cover and drive spindle gear support mechanism and camera shutter removed;

FIG. 2 is a sectional view taken substantially on the line 2—2 of FIG. 1 particularly to show the substantially friction-free drive provided by the ball supports, as well as the relative positions of the film-advance claw extending from the shuttle during the advance portion of the operational cycle providing film engagement and during the return portion of the cycle when the claw is removed from contact with the film strip;

FIG. 3 is a sectional view taken substantially on the line 3—3 of FIG. 1 particularly showing the drive provided by the advance cam and its follower surfaces extending from the shuttle and also the arcuate movement of the shuttle about its longitudinal axis during periods of claw in-and-out motion;

FIG. 4, also a sectional view, is taken substantially on the line 4—4 of FIG. 1 particularly to show the relationship of the drive claw to the film sprocket holes or edge perforations;

FIG. 6 is a partial sectional view taken substantially on the line 6—6 of FIG. 1 showing the spring-plate mechanism for maintaining the moving shuttle in contact with the base through the moving ball supports and the lower follower surface thereof in contact with the up and down cam;

Figure 1:
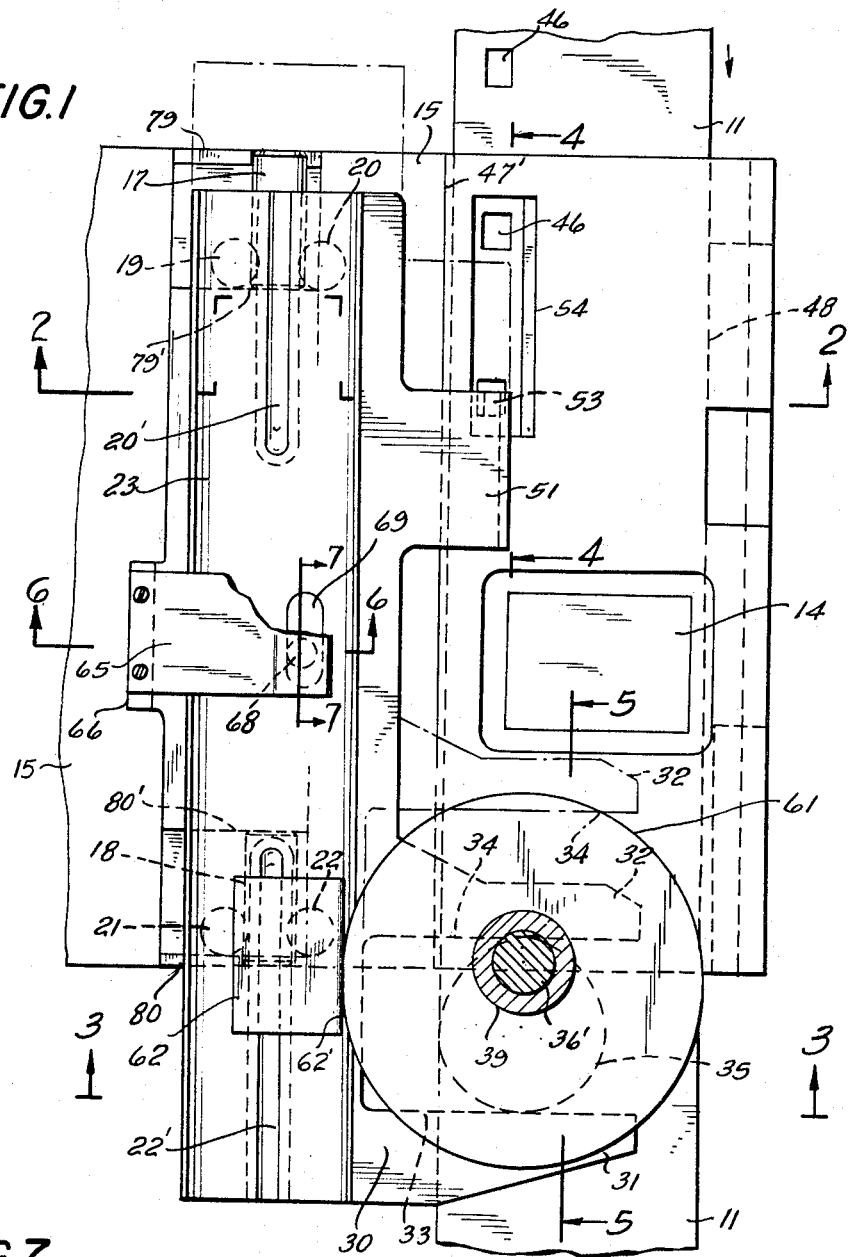
Figure 8:
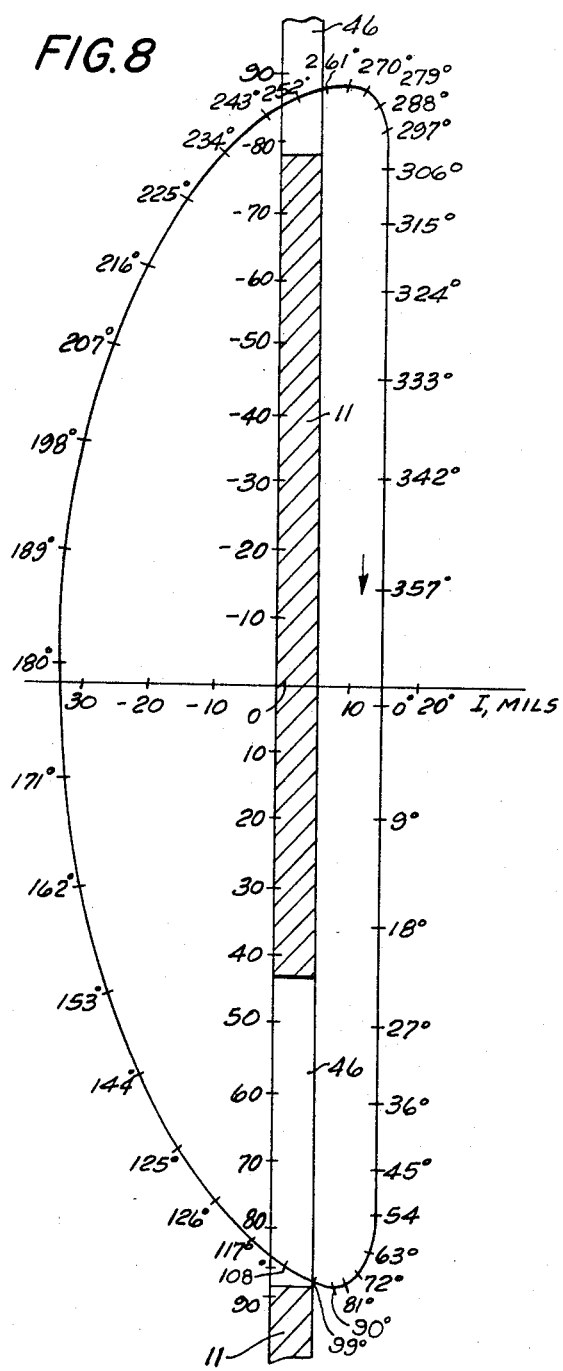

FIG. 7 is also a partial sectional view taken substantially on the line 7—7 of FIG. 1 to show the contacting element for forcing the spring plate adjacent to the reciprocating shuttle; and FIG. 8 is a schematic representation to indicate the approximate path followed by a point, e.g. the tip, of the driving claw in advancing the film one frame height for each shuttle advance in the downward direction, and to indicate also the path followed by the driving claw tip as it is withdrawn from contact with the film and during the return motion in the opposite direction after which driving contact is again made.

Now, making reference to the accompanying drawings and first to FIG. 1, the film strip 11 is arranged to be moved by a drive mechanism past the film gate or window 14 formed in the support base 15. The support base is preferably carried interiorally of a camera component later to be discussed. Two curved bearing supports 17 and 18 extend along the base 15. Each of these bearing supports is preferably in the form of a stationary cylindrical shaft upon which ball bearing elements are adapted to roll, said two shafts being aligned on a common axis extending substantially parallel to the film path at the gate, see FIG. 1.

Two ball elements 19 and 20 engage the stationary bearing support or cylindrical shaft 17, and two other ball bearing elements 21 and 22 engage the curved bearing support or cylindrical shaft 18. The balls 19, 20, 21, and 22 are usually highly polished steel. They act as guides to support and locate an elongated semi-tubular shuttle 23 which extends parallel to the film path at the gate. The shuttle is adapted for reciprocal movement controlled by a cam driving mechanism herein to be explained. The semi-tubular cross-sectional shaping of the shuttle 23 permits it to be positioned to rest upon the balls 19 and 20 at one end and upon the balls 21 and 22 at the other end. An inwardly formed dividing section 20' at one end, and 22' at the opposite end, provides separation of the balls at each end of the shuttle.

Longitudinal movement of the shuttle is along a path which is parallel to the axis of the curved bearing supports 17 and 18. Movement of the shuttle 23 along the curved bearing supports 17 or 18 is accompanied by rolling action of the bearing balls 19, 20, 21 and 22 which maintain generally point contact with the inside wall of the shuttle and with the outer wall of the curved or cylindrical bearing supports 17 or 18, which are normally highly polished hardened steel cylindrical shafts which substantially reduce friction.

Reciprocating movement of the shuttle 23 relative to the base 15 is provided by a rotary advance cam element 35. A yoke 30 extends outwardly from one edge of the shuttle 23 along a plane which is substantially parallel to that of the film during shuttle movement in one direction. The yoke 30 has two outwardly extending arms 31 and 32 which have generally straight interior edges 33 and 34 which engage the cam element and provide a mechanism for moving the shuttle in a reciprocating path relative to the gate 14. The reciprocation stroke covers approximately a distance slightly larger than the film gate width in a direction parallel to the path of film motion.

The advance cam 35 is carried upon a support shaft 36 held in a bearing mount 37 (see FIG. 3) at its upper end and in a bearing 38 at its lower end. The shaft preferably enlarges upwardly from the bearing support as represented at 36'. Cam 35 is formed about the enlarged shaft 36' and provides sufficient motion to the yoke arms and, with them, the yoke and shuttle 23 for the required stroke distance. As seen clearly by FIGS. 1 and 3 in particular, the cam maintains continuous contact with the follower surfaces 33 and 34 of the arms 31, 32.

By reason of the rocking movement which is imparted to the shuttle 23, as will later be explained, the cam face 35 is of a width (see FIG. 3) sufficient to accommodate the shuttle rotation while still maintaining the desired contact with the follower surfaces of the arms 31 and 32. For each rotation of the cam 35, the arms 31 and 32 move back and forth over the full path length. As shown in FIG. 1 for illustration, the yoke arms move such a distance that the arm 32 is displaced from the position shown adjacent to the cam 35 in FIG. 1 (assumed to be one end of the stroke) to a position corresponding to that shown by the dot-dash outline in the same figure (the other end of the assumed stroke). The arm 31 (which is fixed in separation relative to arm 32) is similarly moved, although not so depicted for simplicity of illustration.

During the time that reciprocal movement of the shuttle 23 is provided by the cam rotation and by the follower action of the arms 31, 32, of the yoke 30, the shuttle member itself is moved along the curved bearing supports 17 and 18 by reason of the contact established between the rolling balls 19 and 20 on the support 17 and the balls 21, 22 on the support 18. This arrangement provides contact between the shuttle at points where one end of the shuttle rests upon the balls 19 and 20 and at the other end where the shuttle rests upon the balls 21 and 22. Each ball, of course, makes rolling contact only at one point with the highly polished stationary cylindrical steel shafts 17 or 18. Thus, substantially no friction is occasioned as far as the shuttle is concerned by reason of its movement back and forth other than that friction which results from the cam contacting its follower.

Figure 3:
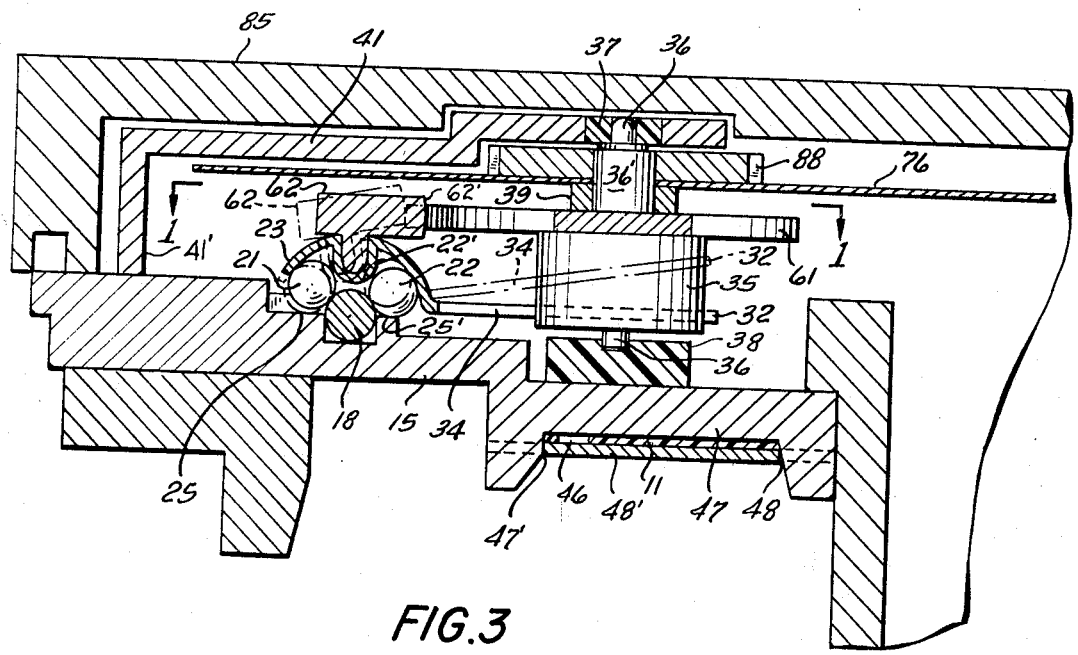

The lower bearing element 38 for the shaft 36, as is evident from FIG. 3, is supported on the main base 15. The upper bearing surface 37 is preferably carried on a bracket 41, separated from the base 15 as shown at 41'. For reasons of simplicity no specific connection has been shown but it is to be understood that the bracket 41 may be connected to the base 15 in any desired fashion.

The film 11 which is to be drawn past the gate 14 by the mechanism herein set forth normally has a series of sprocket holes 46 provided along one edge which are used for driving it through the camera or a projector. As the film is fed into the mechanism here set forth, it normally passes through a guide path schematically represented at 47. This guide path has a a fixed edge guide 47' along one side. Along the opposite edge at 48 it is spring loaded into the film guide region 47. A pressure plate 48' extending along the frame in the region outside the gate is used to maintain film positioning.

Figure 2:
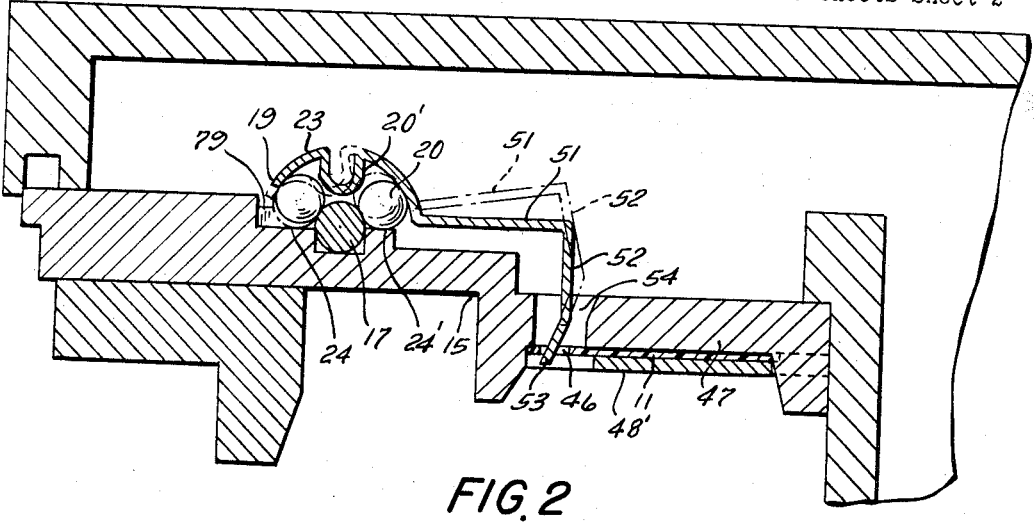
Figure 4:
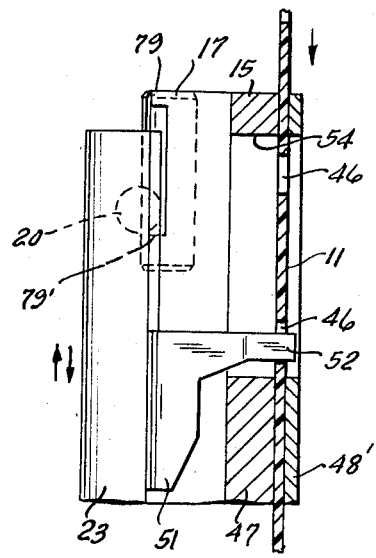

Adjacent the upper end of the shuttle 23 is a laterally extending bracket 51 which has a downwardly depending flange section 52 that terminates in a film drive claw 53 (see FIGS. 2 and 4). This claw 53 is normally turned inwardly at its extreme end, as indicated by FIG. 2. The claw is adapted to move within a generally rectangular slot 54 and as it enters the slot, it extends through the first sprocket hole 46 that it reaches upon shuttle reciprocation.

In order to effect an intermittent feed of the film strip 46 in only one direction, the claw 53 must be moved from engagement with the engaged film perforation at the end of the film advancing stroke and be held out of engagement with the film until the beginning of a subsequent advancing stroke. To this end, the rolling engagement between the shuttle member 23 and the ball bearings 19, 20, 21, and 22 allow for substantially frictionless rotation of the shuttle through a small angle which is sufficient to move the claw 53 between the full line and dotted line positions shown in FIG. 2. The partial rotation of the shuttle is provided by an in-and-out cam 61 which is also supported on the shaft 36. The cam 61 is adapted to bear against a follower 62 carried by the shuttle. The follower surface 62' of follower 62 is normally urged into engagement with the periphery of cam 61, in a manner to be explained below, and is curved to permit it to move relative to the surface of the cam periphery. As can be seen by FIGS. 1 and 3, in particular, the cam 61 is only required to provide a small motion to follower 62. Cam 61 bears against the edge of the follower surface 62' for its full rotational movement. During the advance portion of the film motion the cam 61 is at dwell. The diagram of FIG. 8 will later be referred to in this respect.

As the cam 61 is rotated, contact between its rim and the follower surface 62' of follower 62 causes the shuttle to rotate about an axis corresponding substantially to that of the curved bearing supports 17 and 18 which are aligned to that of the semi-tubular shuttle itself. Rotation of the shuttle 23 about this axis causes a withdrawal of the claw 53 from contact with the film 11 during counter-clockwise turning of the shuttle (see FIG. 2). When the shuttle turns clockwise on the same axis the claw then returns to engage the film strip. The shuttle is normally urged in a clockwise direction by a spring plate 65 secured to the base 15 in any desired fashion by bracket 66 to extend outwardly over the shuttle (see FIG. 6). The upturned end of the spring plate 65 applies pressure to a ball-bearing 68 in the direction shown by the arrow A in FIG. 6 and said ball is arranged to move for a slight distance longitudinally of the shuttle in the ball race 69. One purpose of spring 65 is to impart a rotational moment to the shuttle 23 through the ball 68 such as to maintain contact of the follower 62 with the cam surface 61 at all time (FIG. 3). A second purpose of spring 65 and ball 68 is to maintain contact between the shuttle 23 and the four balls 19, 20, 21 and 22 and in turn between the balls and their supports 17 and 18 at all times. The bottom of the ball race 69, as can be seen from FIG. 7, is tilted at a small angle designated α with respect to the axis of shuttle 23. Because of the tilt angle α, the ball 68 exerts an upward component of force on the shuttle 23 from the pressure of spring 65. This tends to maintain contact between the cam 35 and the lower follower surface 33 at the end of the downward stroke to provide better control of the film position and to reduce noise even after wear causes clearance between the surface 34 and cam 35. The claw retraction commences just prior to the reversal of shuttle movement and is maintained through approximately one-half of the return period of the reciprocating path. Re-entry is completed just after the shuttle movement again begins the forward motion.

Figure 5:
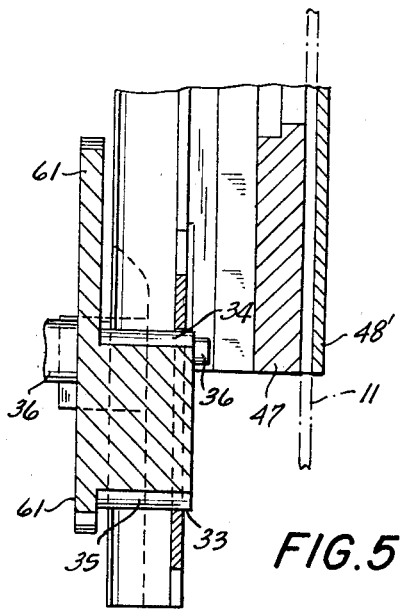
FIG. 5 is a sectional view taken substantially on the line 5—5 of FIG. 1 showing particularly, in elevation, the compactness of the assembly and the compact relative positions of the advance and in-and-out cams.

With this movement taking place, the cams, as particularly evident from FIG. 5, may be formed as a single element and then be readily cast or machined to provide the precise relative motions by which the reciprocating movement is had concurrently with the in-and-out movement of the claw mechanism. With this occurring, it will be appreciated that the claw mechanism should be engaged with the film during a period of time slightly greater than that period during which the shuttle is moving completely in the advance direction. The advance movement of the shuttle begins just prior to the period of contact between the claw 53 and the forward edge of the sprocket hole 46 in the film.

Also, by shaping the cam 61 relative to the cam 35 appropriately, the shuttle can be rotated slightly immediately prior to the end of the stroke of the shuttle in its forward movement. This is depicted by the diagrammatic showing of FIG. 8 where the portions indicated by degrees represent the turn of the shaft 36 relative to the frame. As the figure is shown, bearing in mind the relationship between the film and its apertures, it can be seen that the claw will contact the film at a point which might illustratively be represented at about 302°. By following the same considerations, it can be seen that disengagement between the claw and the film will occur at about 90° (in each case assuming the 0° position to be as shown).

Now, reference can be made further to FIG. 3 at which time, it will be appreciated that the reason for the wide cam face 35 is to permit the yoke 30 to rotate slightly while the shuttle itself is being turned. For this turning, the contact is continually maintained between the inner surface of the yoke arms and the cam proper.

To this point, no mention has been made of the shutter mechanism since the shutter is not per se, a part of the drive mechanism. The shutter, however, is depicted at 76 (FIG. 3) and is of a size such that when rotating with the shaft 36 it will overlap the film gate 14 thereby to reveal and eclipse the film therein supported. The shutter blade structure is such that the precise time of exposure and eclipse or masking can be accurately set.

Adjacent to the curved bearing supports 17 and 18 and extending upwardly from the frame 15 adjacent thereto stop members 79 and 79' are indicated at one end and 80 and 80' at the opposite end. These are to limit the movement of the ball bearing elements in each component and to preclude disengagement while the device is being transported.

The camera as a whole is enclosed normally by a cover element 85 (FIG. 3) which may be fitted over and secured to the base and sub-base elements in any desired fashion. Driving and rotation of the shaft 36, and with it the cams 35 and 61 and the shutter 76, is provided through a drive gear 88. The drive gear is driven from any desired form of motor (not shown) and controlled by any appropriate control switch or connector.

Various modifications may be made without departing from the spirit and scope of what is herein shown and set forth.

I claim:

1. A pull-down mechanism for intermittently advancing a perforated film strip through a gate located in a selected film path, which comprises:
    (1) a stationary arcuate guide member spaced to one side of said gate member and extending substantially parallel to said film path;
    (2) a reciprocatable shuttle having a bearing surface of substantially semi-tubular configuration arranged concentrically of said guide member;
    (3) a film claw on said shuttle and spaced laterally of said bearing portion to engage the perforations of film in said path;
    (4) means for mounting said shuttle on said guide member to reciprocate axially thereof to intermittently advance film through said gate and to oscillate coaxially thereof to move said claw to and from engagement with perforations of a film lying in film path, and including:
        (a) at least two pairs of ball members spaced longitudinally of said guide member and in rolling contact with said semi-tubular bearing surface and with said arcuate guide member, and
        (b) resilient means for holding said semi-tubular bearing surface in rolling contact with said ball members and urging it in a direction arcuately of said guide member to move said claw into engagement with said film;
    (5) advance cam means for reciprocating said shuttle axially of said guide member over a distance commensurate with the perforation pitch of said film; and
    (6) in-and-out cam means connected to rotate said shuttle coaxially of said guide member against the force of said resilient means to remove said claw from engagement with the film and maintain it in said position during the time said shuttle is moving in a direction counter to the direction of film advance.

2. A pull-down mechanism according to claim 1, including a cam follower surface on said shuttle engaged by the advance cam to move said shuttle in a film advancing direction and in which said resilient means urges said cam follower surface into engagement with said advance cam.

3. A pull-down mechanism according to claim 1, in which said resilient means comprises a ball member in rolling contact with a longitudinal portion of said shuttle which is radially displaced from the axis of such guide member; and a leaf spring pressing said ball member against said shuttle in such a manner as to hold the same in rolling contact with said pairs of ball members and at the same time move the shuttle member arcuately of said guide member in a direction to move said claw into engagement with said film.

4. A pull-down mechanism according to claim 3, including a cam follower surface on said shuttle engaged by the advance cam to move said shuttle in a film advancing direction, and in which the longitudinal portion of said shuttle which said spring pressed ball member engages comprises a recessed ball race formed in the periphery of said shuttle and extending longitudinally of said guide member; said ball race having a bottom wall engaged by said ball member which slopes outwardly in a direction counter to the direction of film advance so that said leaf spring pressing on said ball member urges said shuttle in a direction counter to the direction of film advance to hold said follower surface against said advance cam during the time the shuttle is being moved in a film advancing direction.

References Cited

UNITED STATES PATENTS

| | | | |
|---|---|---|---|
| 3,212,840 | 10/1965 | Roman et al. | 352—194 |
| 3,261,654 | 7/1966 | Faber et al. | 352—194 |

FOREIGN PATENTS

| | | |
|---|---|---|
| 507,146 | 11/1954 | Canada. |
| 1,126,392 | 7/1956 | France. |

NORTON ANSHER, *Primary Examiner.*

M. H. HAYES, *Assistant Examiner.*